Figure 6:
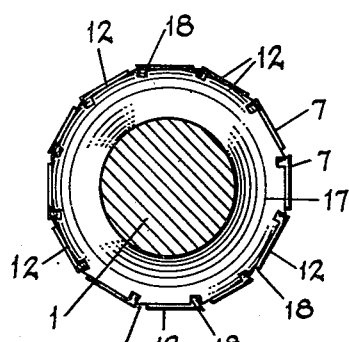

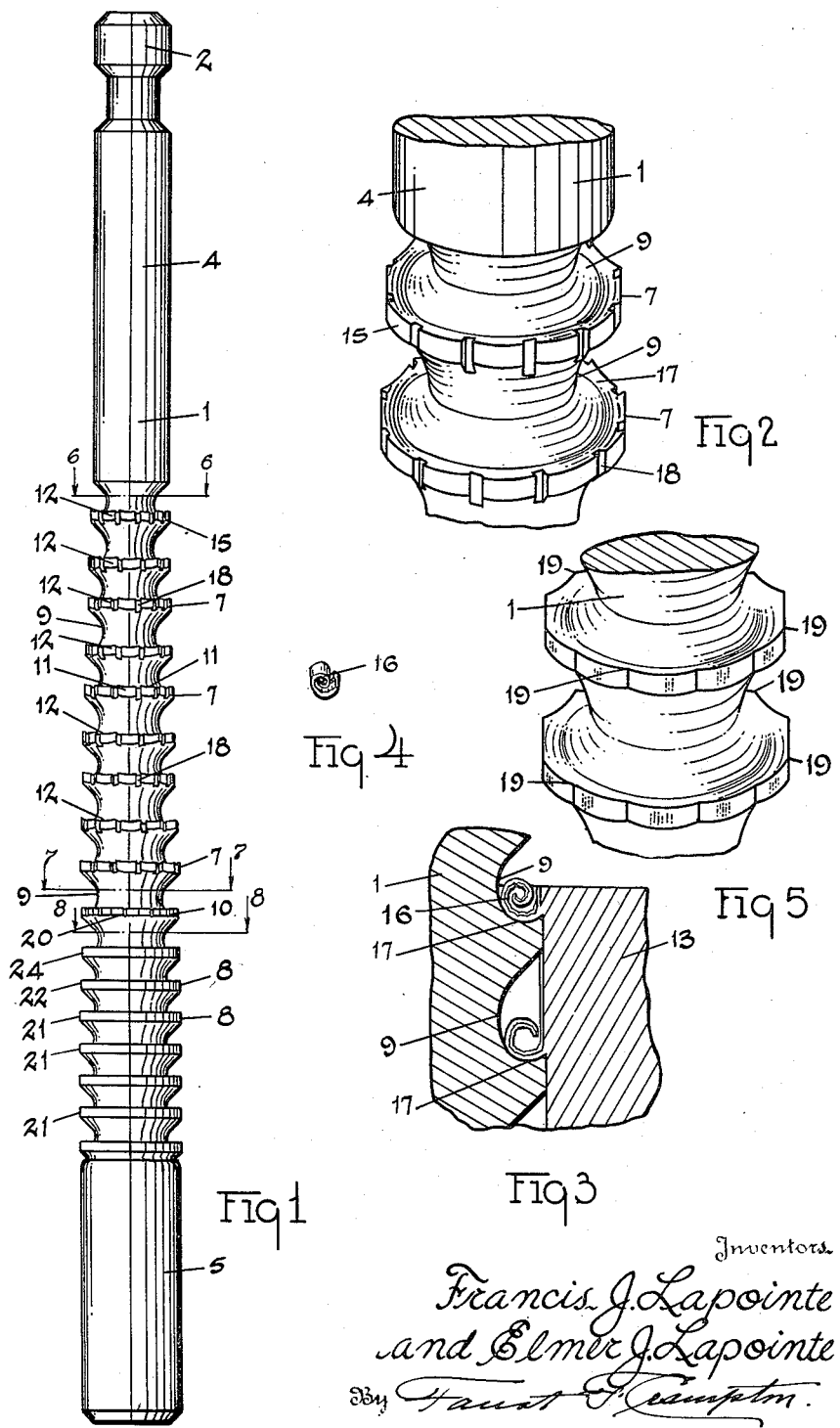

Sept. 24, 1940.     F. J. LAPOINTE ET AL     2,215,616
BROACH
Filed March 10, 1938     2 Sheets-Sheet 2

Inventors
Francis J. Lapointe
and Elmer J. Lapointe
By
Attorney

Patented Sept. 24, 1940

2,215,616

UNITED STATES PATENT OFFICE 2,215,616

BROACH

Francis J. Lapointe and Elmer J. Lapointe, Ann Arbor, Mich., assignors to The American Broach and Machine Company, Ann Arbor, Mich., a corporation of Michigan Application March 10, 1938, Serial No. 195,074

9 Claims. (Cl. 29—95.1)

Our invention relates to broaches for finishing surface parts of metal articles to definite predetermined dimensions. The invention particularly provides broach teeth so constructed and formed as to efficiently broach-cut roughly formed surface parts of metal articles, such as that formed in castings and punchings, preparatory to finish-cutting and surface finishing to exact predetermined sizes by the broach. The teeth for cutting roughly formed surfaces or articles or parts are frequently referred to as "rough-cutting teeth."

Broaches embodying our invention are provided with a plurality of rough-cutting teeth having slightly curved edge portions, but located in planes extending lengthwise of the broach, and, also, circular cutting teeth located in planes extending at right angles to the axis of the broach for producing the finishing cut. The teeth, or certain of the teeth of the broach, are formed to have cutting edges of progressively increasing maximum diameters for progressively increasing the sizes of the openings during the broaching operations, although, as is common, the final finish of the surface of holes may be produced by two or more teeth of the same size, which insures the formation of smooth, clean, exact cylindrical surfaces and, also, in some cases, operate to burnish the surfaces, which is of particular advantage where the surfaces are to be used as bearing surfaces.

Our invention provides means whereby broach-cutting may be produced by the use of less power than that used by broaches heretofore commonly used for producing the same dimensional surfaces in metals having the same characteristics or properties. Also, our invention provides a means whereby a fewer number of rough-cutting teeth are required for producing the same dimensional surfaces. Also, the invention provides means whereby smaller "chip" or shaving chambers may be used intermediate each of the teeth for receiving the metal removed during the broach-cutting and, thus, enable the use of shorter broaches and less power for producing the same finished surfaces. The broaches embodying our invention may be made 50 or 60 per cent of the length of the broaches heretofore used having the same metal characteristics and endurance, and operated by the same power. Thus, our invention greatly reduces the original cost and the operating and maintenance costs of broaches.

The invention provides a plurality of cutting teeth, each having relatively short edge portions located in planes extending lengthwise of the broach, the contiguous edge portions of each tooth being located in planes at an angle less than 180°. The teeth are polygonal in form and the cutting edges of the teeth are, thus, substantially polygonal in outline, and the edge portions are defined by corners or points formed by the inclined relation between the contiguous edge portions that progressively split the metal of the chips as the metal is removed by the teeth, or, if desired, the straight edge portions may be separated by notches that are preferably disaligned with the notches of the contiguous teeth for dividing the metal removed.

The invention also provides a broach having rough-cutting polygonal teeth, the edge portions of each tooth being located in the same planes, extending lengthwise and inclined with respect to the axis of the broach, in which the correspondingly positioned edge portions, with respect to the axis of the broach, of the other teeth are located.

The invention may be embodied in broaches that may be varied in their details as to form and construction and used for different purposes. To illustrate a practical application of the invention, we have selected a 12-inch or 14-inch broach embodying the invention, which may be used to produce finished one-inch holes in metal of considerable thickness, such as three-inch metal or less, from roughly formed holes. The selected broach is shown in the accompanying drawings.

Figure 7:
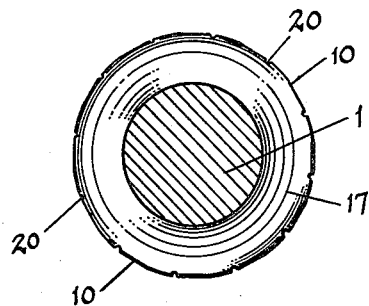
Figure 8:
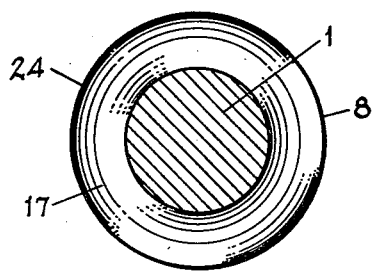
Figure 10:
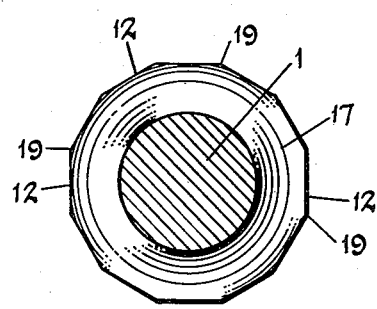
Figure 9:
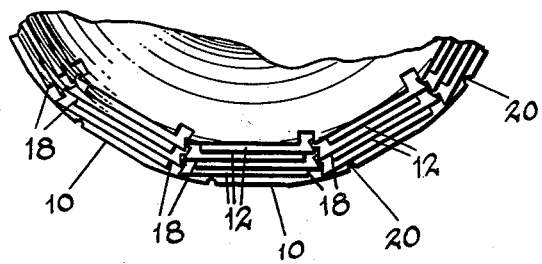

Fig. 1 of the drawings illustrates a "pull" broach containing the invention. Fig. 2 illustrates an enlarged perspective view of two of the rough-cutting teeth of the broach. Fig. 3 illustrates a still further magnified view of two of the rough-cutting teeth showing the formation of the shavings as the teeth progress through the work. Fig. 4 of the drawings illustrates one of the shavings, full size, produced by one of the cutting edge portions of the rough-cutting teeth of the broach shown in Fig. 1. Fig. 5 illustrates two untouched teeth of a modified form of a broach containing our invention. Fig. 6 is a view of a section, taken on the plane of the line 6—6, indicated in Fig. 1. Fig. 7 is a view of a section of the broach, taken on the plane of the line 7—7, indicated in Fig. 1. Fig. 8 is a view of a section, taken on the plane of the line 8—8, indicated in Fig. 1. Fig. 9 is an enlarged view of the teeth showing the relation of the notches in a plurality of teeth when looking down on a part of the broach. Fig. 10 is a view of a section of the modified form of broach shown in Fig. 5.

The broach 1 is provided with a head 2, of the type commonly used in connection with broaches, for connecting the broach to a chuck secured to a drawbar or drawhead of a broaching machine. 4 is the shank of the broach. The length of the shank 4 is dependent upon the thickness of the metal or length of the article through which the head 2 is inserted to connect the head 2 with the drawhead of the machine. The broach may also be provided with a "butt" or end part 5. Elevators, for raising the broach to insert the head and shank through the work and to insert the head into the chuck of the drawhead, are used in many pull broaching machines. The elevators commonly have receiving sockets, in which the end part 5 of the broach may be placed, for maintaining the broach upright.

The broach is provided with two sets of teeth, the rough-cutting teeth 7 and the finish-cutting teeth 8. The broach is also provided with a tooth 10, located intermediate the rough-cutting teeth 7 and the finish-cutting teeth 8, which operates to modify the shape of the surface of the hole, as produced by the rough-cutting teeth, to a closer approximation of the contour of the surface produced by the finish-cutting teeth 8. Also, the broach is recessed just in advance of each tooth to form a chamber 9 in which the portions of the metal, removed from the work in the broach-cutting operation, are collected and carried to the exterior of the article.

The rough-cutting teeth 7 are formed to have short edge portions 11, the contiguous edge portions 11 being disposed in planes at an angle less than 180° to each other, that is, the planes of the contiguous cutting edge portions are slightly inclined with respect to each other. The correspondingly short cutting edge portions of the teeth 7, with respect to the axis of the broach, are located in planes that extend lengthwise the broach and are inclined with respect to the axis of the broach. Thus, for example, the edge portions 12 of the teeth 7 are correspondingly located with respect to the axis of the broach and are located in the same plane, that is inclined to the axis of the broach. Consequently, there is a progressive increase in the radial dimension of the centers of each of the cutting edge portions. This is also true of the corners or points formed at the ends of the cutting edge portions. In the formation of the broach, the teeth 7 are first formed circularly and so as to have progressively increasing diameters. They are then ground along planes inclined to the axis of the broach to form sharp cutting edges and, consequently, to produce substantially polygonally formed cutting edges.

The inclination of the planes to the axis of the broach, along which the teeth 7 are ground to produce the cutting edges, is such that the intersection of the planes with the tooth 10 produces alternate circularly formed edge portions and edge portions located in the planes. The tooth 10, consequently, operates to partially shape the surface formed by the rough-cutting teeth 7 to an approximate cylindrical form, while the following tooth 8 operates to complete the cylindricity of the interior surface and the remaining teeth 8 operate to finish-cut the opening as the broach is drawn upwardly through the work. The teeth following the tooth 10 operate substantially the same as the circular cutting teeth, commonly used in broaches for finish-cutting the work to exact predetermined size.

The cutting edge portions of the tooth 15, which is the first to engage the work, operates to cut the roughly formed substantially cylindrical surface of the hole in the article and form plane surfaces of narrow width, which extend roughly parallel to the axis of the hole as originally roughly formed. The correspondingly located cutting edge portions of the succeeding teeth 7 progressively deepen the cuts, as measured radially, made by the cutting edge portions of the tooth 15, and, also, to progressively widen the plane surfaces formed by the tooth 15 and to straighten the axis of the hole as originally roughly formed. Thus, each of the teeth 7 shave metal off plane surfaces, except the tooth 15, and each of the teeth 7 form plane surfaces for each succeeding tooth to operate upon. Shaving from the plane surfaces produces small involute shavings 16 of uniform thickness and small diameter which readily roll from the plane surfaces.

The shavings 16, produced by one of the rough-cutting teeth of the broach shown in Fig. 1 of the drawings as presented herewith and cut from a surface three inches in length, will be about the size and form of that shown in Fig. 4 of the drawings. In the sectional magnified view of parts of the broach and work shown in Fig. 3, is indicated the formation of the shaving formed by rough-cutting teeth when they have approached the upper surface of the article. As the cutting edges of the teeth move along the surface of the hole, the metal of the shaving is crowded together or "wrinkles" at the cutting edge. This is due to the high resistance to separation of the metal. Although the amount of metal removed by each tooth is very thin, the resistance to removal greatly increases its apparent thickness. The shaving moves along the curved surface 17 that forms the "rake" of the tooth and curves upwardly to form the involute.

The metal of the shavings 16, produced from plane surfaces by the broach of our invention, as it is separated from the work 13, is caused, by the curved surfaces 17, to continuously roll, which permits the use of a greatly reduced power to operate the broach and, also, enables the use of broaches having smaller chambers between the teeth and, thus, enables the use of less teeth. The reduction of the number of the teeth and the size of the chambers correspondingly reduces the length of the broaches.

Where the metal is removed, by a circularly formed cutting edge, from a cylindrical surface, as is heretofore commonly done by hole-cutting broaches known in the art, the cylindrically shaped part of the metal removed is crowded together at the edge of the tooth to greatly thicken the metal removed, in the same manner that occurs when removing metal from a plane surface. In addition, removing the metal from the cylindrical surface by a circular cutting edge produces a squeezing operation in that the cutting edges forces the metal from the circle of the outer surface of the edge of the tooth into a smaller circle of the inner surface or the rake surface of the tooth. The tooth forces the metal into a smaller radius, which operates to further increase the thickness of the metal thus separated and increases the power required to operate the broach. Also, the cylindrical form of the thickened metal removed produces an exceedingly rigid structure that greatly resists deformation, in both radial and axial planes. As the removed part of the metal progresses to the part of the curved surface 17 that forms the bottom of the chamber 9 within the cutting edge of the broach, the curvature of the rigid separated metal is forced to reverse which produces a corresponding additional resistance to the movement of the broach. This causes the metal removed to break up into irregular chips which clog and quickly fill the chamber. The use of the circular rough-cutting edges, thus, greatly increases the power required to operate the broach.

The chips occupy a greater space in the chamber than the metal shavings because of their irregular forms into which they split up. Their corners or projections often engage the surface of the metal of the work above the tooth and penetrate the surface. To avoid jamming the surface by the chips necessitates a larger chip chamber and, consequently, a correspondingly greater distance between contiguous teeth, since the metal cannot be removed from the broach between the teeth because of the required limitations of the diameter of the broach parts intermediate the teeth to produce the required broach strength and prevent fracture in operation. Thus, circular cutting and crowding, and corresponding thickening of the metal removed and its corresponding increased rigidity, because of its form and thickness and its movement toward the axis of the broach and reversal of curvature and the cracking up of the metal into chips, causes the consumption of considerable power in addition to that required to merely cut the metal and requires longer chip chambers.

The planes, in which the cutting edge portions of the teeth of the broach, embodying our invention, are located, intersect the frustumal rake surfaces of the teeth at the cutting edge portions as shown in Fig. 5, and form slightly curved cutting edges located in the planes inclined to each other, as well as to the axis of the broach, and form marked corners 19 intermediate contiguous cutting edges of each tooth.

The projecting corners 19, of the substantially polygonally formed teeth, operate to weaken the metal separated from the work in the broaching operation, and as the metal is moved along the surface that forms the "rake" of the teeth, and the shavings will progressively split lengthwise at the corners and the parts will readily roll, in the form of narrow shavings, as the teeth gather the metal, as shown in Fig. 4. The rolls of metal or shavings may, thus, be readily discharged from the chambers 9.

If desired, the rough-cutting teeth 7 of the broach may be provided with notches 18, shown in Figs. 6 and 9, the notches of the contiguous teeth being located in disaligned arrangement, with respect to the direction in which the broach is moved, to perform its cutting operation. Preferably, in the form of construction shown in the drawings, the notches of the teeth are disposed on alternate sides of the broach axial planes that extend through the corners of the teeth. Thus, the notches are, preferably, located contiguous to planes in which the axis of the broach is located and which extend through the corners formed by the cutting edge portions, the notches of contiguous teeth being located on opposite sides of the said planes.

The notches 18 of each tooth leave metal on the work, in the form of ridges, having a height substantially equal to one-half the difference in the diameter of the contiguous teeth 7 of the broach, which, however, is removed by the following tooth. The notches operate to subdivide the shavings along definite lines and enables discharge of the shavings from the chambers 9.

Preferably, the tooth 10, is provided with notches 20. The ridges, produced by the notches 20, will be removed by the tooth 8 located proximate to the tooth 10.

The finishing teeth 8 of the broach may be varied, as may be desired, to produce varying results in like or dissimilar metals. The broach shown in the drawings is provided with five, full-sized, as to the hole to be formed, and complete circular cutting teeth, namely, the teeth 21. The sixth tooth from the end of the broach, namely, the tooth 22, is slightly smaller in diameter, such as one-thousandths of an inch, than the cutting edges of the teeth 21, and the tooth 24 is slightly smaller in diameter than the tooth 22. The maximum diameter of the tooth 10 is slightly smaller than the diameter of the tooth 24. Thus, the teeth 24, 22, and the proximate tooth 21, progressively increase in diameter.

We claim:

1. In a broach, a plurality of teeth surrounding the longitudinal central axis of the broach, certain of the teeth having polygonally formed cutting edges and other of the teeth having circularly formed cutting edges located in planes extending at right angles to the said longitudinal central axis of the broach, the diameters of the latter being larger than the diametric measure between the corners of the former.

2. In a broach, a plurality of substantially equiangular, polygonally formed teeth of progressively increased diametric measure between corners thereof and having plane lateral surfaces disposed about the longitudinal central axis of the broach.

3. In a broach, a plurality of teeth having substantially equiangular, polygonally formed cutting edges of progressively increasing diametric measure between the corners thereof surrounding the longitudinal central axis of the broach, the corners located in planes extending radially through the longitudinal center axis of the broach and equiangularly spaced.

4. In a broach, a plurality of substantially polygonally formed teeth surrounding the longitudinal central axis of the broach and having plane lateral surfaces and cutting-edge portions located in planes that are inclined to the said longitudinal central axis of the broach and to each other.

5. In a broach, a plurality of teeth surrounding the longitudinal central axis of the broach, each tooth having a plurality of cutting-edge portions, the cutting-edge portions located in planes that are inclined to the said longitudinal central axis of the broach and to each other, each tooth having a cutting-edge portion located in each of the said planes.

6. In a broach, a plurality of teeth disposed about the longitudinal central axis of the broach, each tooth having inner concave surfaces and exterior plane surfaces located inclined to the said longitudinal central axis of the broach, and each tooth having cutting-edge portions located at the edges of the inner concave surfaces and the exterior plane surfaces.

7. In a broach, a plurality of teeth surrounding the longitudinal central axis of the broach, certain of the teeth having substantially equiangular, polygonally formed cutting edges located in planes that are inclined to the said longitudinal central axis of the broach and to each other, each tooth of said certain teeth having a cutting-edge portion located in each of the said planes and other of the teeth having circularly-formed cutting edges.

8. In a broach, a plurality of teeth, each tooth of said certain of the teeth having a plurality of cutting-edge portions, the cutting-edge portions located in planes that are inclined to the axis of the broach and to each other, each tooth having a cutting-edge portion located in each of said planes and other of the teeth having cutting-edge portions located in said planes and separated by arcuate edge portions located in planes, at right angles to the axis of the broach.

9. In a broach, a plurality of polygonally formed teeth, each tooth having equiangular and equilateral plane sides terminating in cutting edges; notches located at the corners of the polygonally formed teeth for producing chip separation, the notches of the contiguous teeth located on opposite sides and contiguous to the planes extending through the corners of the teeth and the axis of the broach.

FRANCIS J. LAPOINTE.
ELMER J. LAPOINTE.